United States Patent [19]
England

[11] Patent Number: 5,295,063
[45] Date of Patent: Mar. 15, 1994

[54] DATA ACQUISITION SYSTEM HAVING SETUP DUPLICATION CAPABILITY

[75] Inventor: Brent A. England, Newton, Iowa

[73] Assignee: Maytag Corporation, Newton, Iowa

[21] Appl. No.: 872,914

[22] Filed: Apr. 22, 1992

[51] Int. Cl.$^5$ .................. G05B 19/42; G06F 15/46
[52] U.S. Cl. .................. 364/188; 364/189; 364/192; 364/146; 307/38
[58] Field of Search ............. 364/145, 146, 131, 138, 364/188, 189, 191, 192, 550; 340/825.06, 310 R; 307/11, 38; 455/353

[56] References Cited

U.S. PATENT DOCUMENTS

| | | | |
|---|---|---|---|
| 3,112,378 | 11/1963 | Holzer | 200/33 |
| 4,001,599 | 1/1977 | Karklys | 307/141 |
| 4,109,775 | 8/1978 | Hayashi | 194/10 |
| 4,119,948 | 10/1978 | Ward et al. | 340/151 |
| 4,146,778 | 3/1979 | Wain | 235/92 |
| 4,203,014 | 5/1980 | Harris | 200/38 |
| 4,216,461 | 8/1980 | Werth et al. | 340/149 |
| 4,279,012 | 7/1981 | Beckedorff et al. | 364/146 |
| 4,301,542 | 11/1981 | Weintraub et al. | 455/353 |
| 4,306,219 | 12/1981 | Main et al. | 340/825.54 |
| 4,316,532 | 2/1982 | Lavasseur | 194/1 |
| 4,328,539 | 5/1982 | Heeger | 364/144 |
| 4,336,481 | 12/1982 | Main et al. | 340/854.54 |
| 4,369,442 | 1/1983 | Werth et al. | 340/825.35 |
| 4,390,965 | 6/1983 | Albert | 364/400 |
| 4,409,649 | 10/1983 | Heeger | 364/144 |
| 4,463,446 | 7/1984 | Shah et al. | 364/900 |
| 4,703,306 | 10/1987 | Barritt | 340/310 R |
| 4,706,794 | 11/1987 | Awane et al. | 194/217 |
| 4,797,656 | 1/1989 | Keppler | 340/539 |
| 4,808,841 | 2/1989 | Ito et al. | 307/11 |
| 4,828,097 | 5/1989 | Kresta et al. | 194/227 |
| 4,844,229 | 7/1989 | Friedman et al. | 194/226 |
| 4,845,484 | 7/1989 | Ellsberg | 340/825 |
| 4,899,129 | 2/1990 | MacFadyen et al. | 340/310 R |
| 4,899,217 | 2/1990 | MacFadyen et al. | 358/86 |
| 4,916,642 | 4/1990 | Kaiser et al. | 364/550 |

OTHER PUBLICATIONS

"A DDCMP based Communications Protocol for the Vending Industry Data Transfer Standard," International Edition, Version 2, Feb. 1, 1992, pp. 5.i through 5.38 from a manual entitled *The Vending Industry Data Standard* produced for distribution to the members of the National Automatic Merchandising Association.

"Low Speed Optical Comms Link for the Vending Industry Data Transfer Standard," American Edition, Appendix A Draft 1, Jun. 12, 1990. pp. 5.Ai through 5.A8 from a manual entitled *The Vending Industry Data Standard* produced for distribution to the members of the National Automatic Merchandising Association.

Wick, J. "A Question and Answer Guide to Electronic Audit Systems," 1992. The Greenwick Company Inc. of Parkesburg, Pa. 20 pages plus an Audit Product Comparison Checklist (2 pages), no month.

DDCMP, Version 4.0, Mar. 1, 1978.

W. Stallings, *Data Computer Communications*, pp. 105–110 (MacMillan Publishing Co. 1985) Month Unknown.

*Primary Examiner*—Jerry Smith
*Assistant Examiner*—Paul Gordon
*Attorney, Agent, or Firm*—Willian Brinks Hofer Gilson & Lione

[57] ABSTRACT

A data acquisition system having setup duplication capability so that the setup or portions of the setup of one appliance can be duplicated onto other appliances by electronic means without affecting the identity of each appliance. More particularly, a method and apparatus are provided for effecting a setup record change throughout a plurality of appliances. A first appliance communicates with an external probe that has a memory including at least a first and a second buffer. The setup record of the first appliance is stored in the first buffer. A second appliance is then communicated with through use of the probe and its setup parameter of the setup record buffer, then at least one setup parameter of the setup record stored in the second buffer is replaced by a setup parameter of the setup record stored in the first buffer to create a new setup record and the contents of the second buffer are transmitted to the second appliance.

15 Claims, 7 Drawing Sheets

DATA ACQUISITION SYSTEM HAVING SETUP DUPLICATION CAPABILITY

REFERENCE TO RELATED APPLICATIONS

The disclosures of the following copending applications assigned to the assignee of the present application and filed concurrently herewith are specifically incorporated by reference:

"Control Board having Dual Means of Configuration," by Brent A. England and Scott A. Merkle, U.S. patent application Ser. No. 07/872,623 filed Apr. 22, 1992; and "Data Acquisition System Having Selective Communication Capability," by Scott A. Merkle and Douglas A. Oshsner, U.S. patent application Ser. No. 07/872,062 filed Apr. 22, 1992.

BACKGROUND OF THE INVENTION

1. Field of the Invention

The present invention is directed to the field of data acquisition systems, and in particular, to a data acquisition system having setup duplication capability.

2. Description of the Prior Art

In the commercial laundry field it is desirable to provide laundry appliances, such as washers and dryers, with owner selectable features. For example, a laundromat owner or route operator may wish to configure one or more appliances to provide for each appliance a selected cycle length for a selected price. Owners may wish to configure or reconfigure similar appliances to provide similar operation.

For these reasons, manufacturers of such appliances often provide ways in which the appliance can be configured or reconfigured as desired. For example, the coin receiving mechanisms typically utilized in conjunction with vending machines, including commercial laundry appliances, permit the owner to select a desired vend price from a range of available prices. Many techniques are known for providing such selectable pricing, including techniques for mechanically adjusting an electro-mechanical coin mechanism or counter. Examples of such mechanical adjustment means are described in U.S. Pat. Nos. 4,828,097 (Kresta et al.) and 4,844,229 (Friedman et al.) which employ three-way adjustable price setters and linkage quickly to change the coin control mechanism among any one of three preset prices. A vender which can easily preset the vend price by suitably opening and closing a plurality of switches is described in U.S. Pat. No. 4,109,775 (Hayashi). Furthermore, electronic means are commonly used to adjust an electro-mechanical coin mechanism or counter. For example, electronic adjustment means utilizing selection switches which are also used for sale purposes to store data in a microcomputer vending machine are described in U.S. Pat. Nos. 4,316,532 (Levasseur) and 4,706,794 (Awane et al.).

An appliance programmer integrated circuit having a basic program of operation which may be modified two ways is described in U.S. Pat. No. 4,001,599 (Karklys). The basic program may be automatically altered by a program change command circuit which is incorporated in the programmer circuit and which scans certain terminals of the circuit to determine the particular program application. In addition, the operator is provided with switches for selectively altering the basic program.

Similar adjustments have been provided for certain mechanical operations of an appliance. For example, electronic and electro-mechanical timers have been used in conjunction with washers and dryers in a commercial laundry environment wherein user-selectable timing intervals are provided. For example, U.S. Pat. No. 4,203,014 (Harris) describes a mechanically adjustable interval cycle timer. Rotation of a setting shaft changes the angular position of a stop lug which in turn controls the starting position of a lug on a reset gear. U.S. Pat. No. 3,112,378 (Holzer) describes a mechanical device for changing the program of washing machines by using switching means controlled by a keyplate.

State-of-the-art commercial laundry appliances today further incorporate data accumulation and communication capabilities. For example, switches or electro-optical detectors may be provided to monitor certain aspects of machine operation, such as monies deposited, cycles vended, certain door openings, power failures and other useful information. These data may be retained in electronic memory within the appliance and subsequently communicated to a portable collection unit, such as a hand held probe or computer. Systems of this type are described, for example, in U.S. Pat. Nos. 4,369,442 (Werth et al.); 4,216,461 (Werth et al.) and 4,306,219 (Main et al.). In such a system, the laundry appliance is provided with an appropriate means for establishing communication with an external device, such as an infrared optical communication link.

It is known to utilize electronic means for configuring the operating parameters of a vending machine. For example, U.S. Pat. No. 4,328,539 (Heeger) describes a sequence controller utilizing a microprocessor to control timing and other sequence information in connection with a vending machine. The specific timing parameters are alterable electronically by means of a service module which may be coupled to the vending machine to alter certain memory code corresponding to sequence timing and other aspects of the machine operation, as desired. Thus, the vending machine is flexibly reconfigurable for various modes of operation, utilizing a detachable electronic module.

The prior approaches for permitting a user to selectably configure an appliance as described above have many limitations. For example, when parameters for individual machines are altered by a single service module having setup information stored in its memory a substantial waste of time and expense is incurred. This waste is evident if a second machine is to be setup identically to the first machine, the same setup information must be entered into the memory of the service module for the second machine because parameters for each machine contain information which is unique to that machine, such as identification number and position. If the same setup used for the first machine was used on the second machine, the first and second machines would become indistinguishable. Thus if many appliances are to be setup with similar or identical parameters, it becomes time consuming to enter the same or similar setup information for each machine in the memory of the service module before transmitting it to the appropriate machine.

It is also desirable to provide commercial laundry appliances having data acquisition systems which allow setup records or portions of setup records to be copied from one appliance to another without altering information concerning the identity of each appliance. Unfortunately, none of the prior art devices or methods provide for such a duplication capability.

SUMMARY OF THE INVENTION

The present invention allows a user to duplicate the setup record of one appliance to other appliances thereby providing a very quick and easy way to propagate a parameter change, such as pricing or cycle length, throughout an entire operation having many appliances. This eliminates the need for preloading setup records into the memory of the probe for each appliance. Important to the present invention is that the duplication process does not alter the identification of each appliance.

Further objects and advantages of this invention will become more apparent and readily appreciated from the following detailed description of the present invention with reference to the accompanying drawings.

DETAILED DESCRIPTION OF THE PRESENTLY PREFERRED EMBODIMENTS

Figure 1:
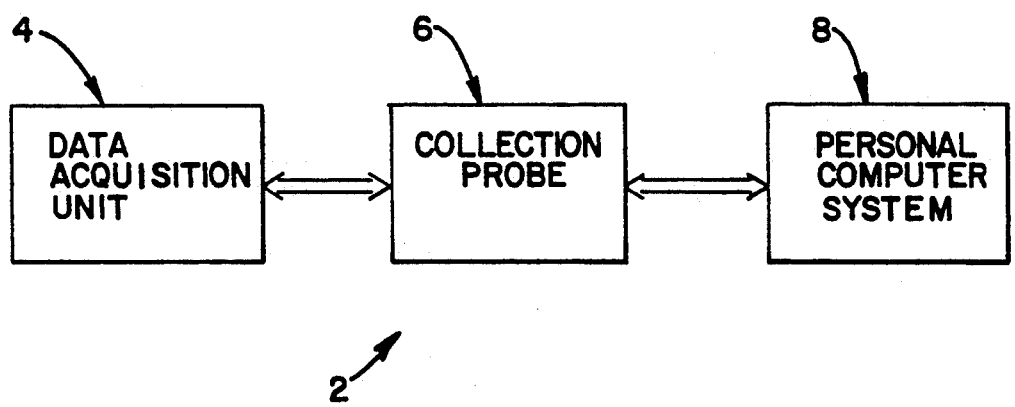
FIG. 1 illustrates a data acquisition system according to the present invention.

FIG. 1 illustrates a data acquisition system 10 according to the present invention. The data acquisition system 10 incorporates three major elements: a data acquisition unit 12 which resides in an appliance such as a washer or dryer and is integral with the appliance's controller; a commercially available collection probe 14 which is carried by a route operator to interface with one or more of the appliances having data collection capability; and a personal computer system 16 for use by the route operator to receive collected information from the collection probe 14 and perform desired business analyses on the information. One aspect of the present invention is directed to the series of messages, referred to as protocol, exchanged between data acquisition units and a collection probe during a duplication procedure.

Figure 2:
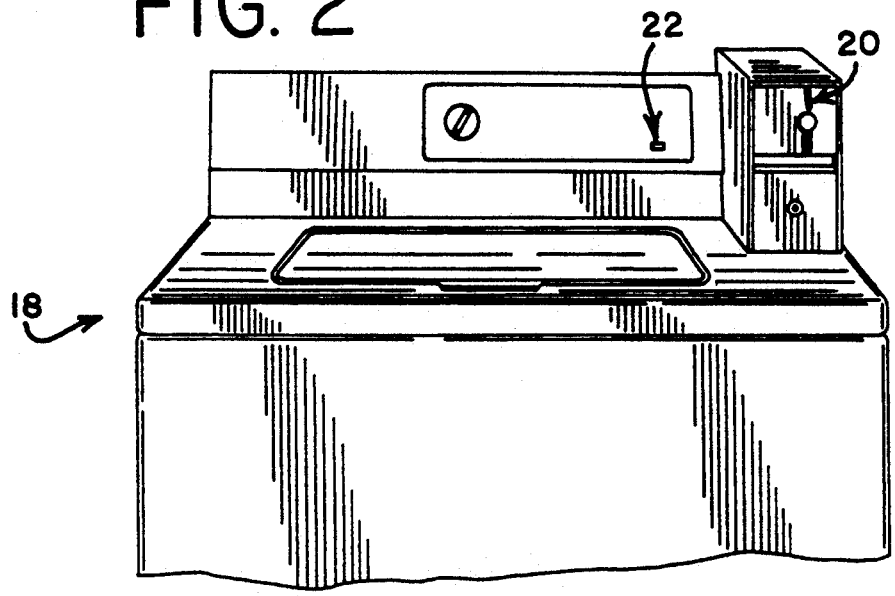
FIG. 2 illustrates an appliance such as a washer according to the present invention.

FIG. 2 illustrates an appliance such as a washer 18 according to the present invention. The washer 18 is equipped with at least one coin drop slot 20, an optical window 22 behind which is an optical transceiver (not shown) having an optical emitter and an optical detector and a panel (not shown) behind which is a group of switches. The optical window 22 is provided so that the washer 18 can communicate with an external device such as a portable collection unit, for example, a hand held probe (see FIG. 3). Alternatively, the switches located behind the panel are located so as to be easily accessible by an owner or route operator and are provided to setup the appliance as described in copending patent application, incorporated herewith, entitled "Control Means Having Dual Means of Configuration" by Brent A. England and Scott A. Merkle and assigned to the MAYTAG Corporation, U.S. patent application Ser. No. 07/872,623 filed Apr. 22, 1992. Preferably, the switches are placed behind a limited access panel.

Figure 3:
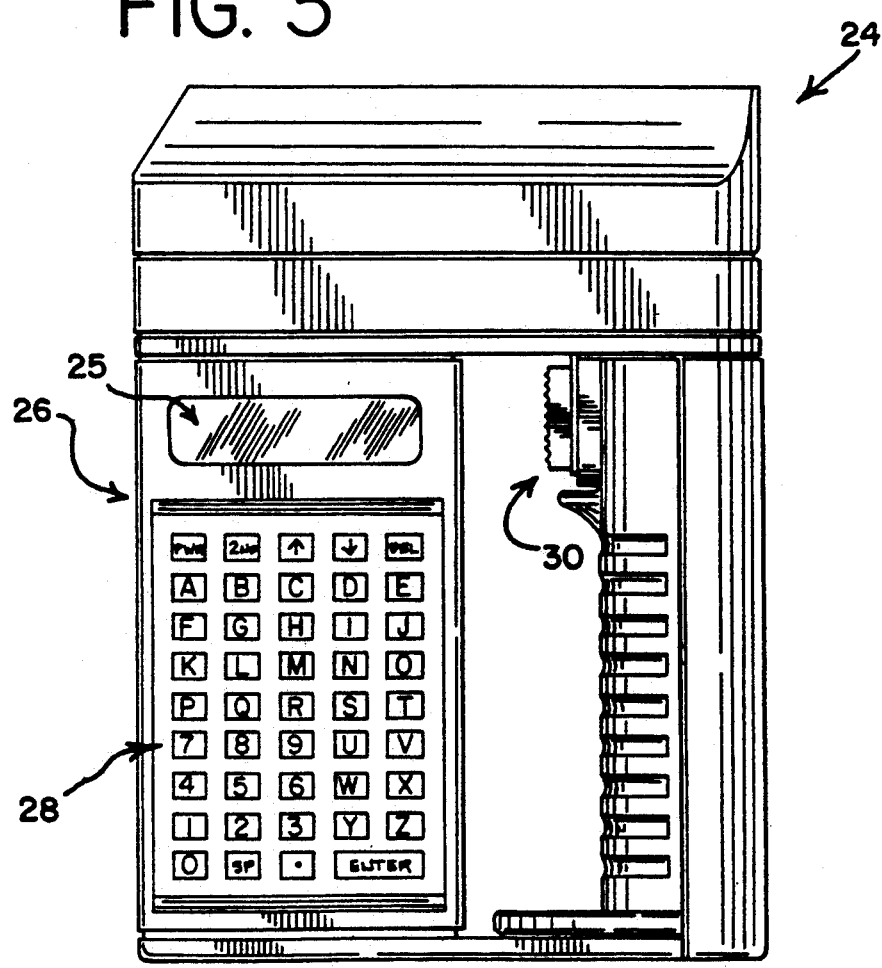
FIG. 3 illustrates an external device in the form of a portable probe which may be used in conjunction with the present invention.

FIG. 3 illustrates an external device in the form of a portable probe 24 which may be used in conjunction with the present invention. The probe 24 has an optical communications window 26 located on the side of the probe 24 behind which lies an optical transceiver (not shown) formed by an optical emitter and an optical detector. In addition, a keypad 28 is provided to allow the owner or route operator to select a mode of operation and enter data. There are generally three modes of operation of concern to the present invention; collection, monitor and setup which will be described in detail hereinafter. A liquid crystal display (LCD) screen 25 displays menus from which the user may select options including the three modes of operation discussed above. A trigger button 30 is used to initiate sending signals to and receiving signals from the optical communications window 22 of the washer 18 of FIG. 2 after a selection is made. Preferably the probe 24 employed utilizes infrared communications although other optical wavelengths may be similarly utilized. An infrared probe is available from Mars Electronic Company commercially as the MARS MEQ TM 130 Portable Data Terminal.

Figure 4:
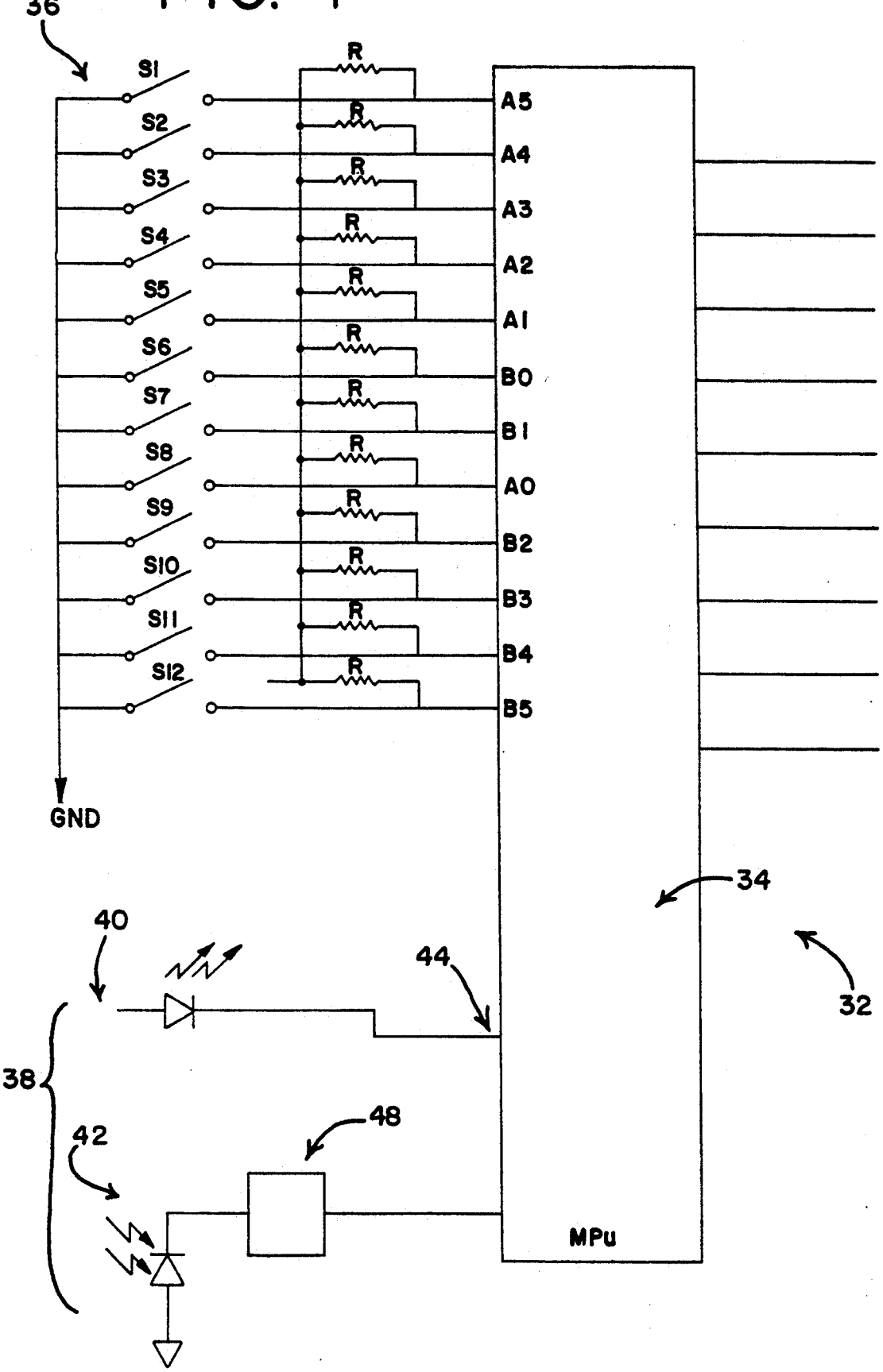
FIG. 4 is an electrical schematic of a portion of a data acquisition unit located on a control board having an optical communication link in accordance with the present invention for the appliance shown in FIG. 2.

FIG. 4 is an electrical schematic of a portion of a data acquisition unit located on control board 32 having an optical communication link in accordance with the present invention for the appliance shown in FIG. 2.

The control board 32 includes a microprocessor 34, a group of dual inline package (dip) switches 36 and an optical transceiver 38 formed by an optical emitter 40 and an optical detector 42. Preferably the microprocessor 34 is a Hitachi microcomputer, model number HD 6305VO. Many types of switches may be used and preferably a 12 position dip switch, model number 76SB12S available from Grayhill of LaGrange, Ill. is used.

In the present invention, an appliance, such as a washer, has a relay (not shown) mounted on the control board to power or initiate an electro-mechanical timer. The timer sequences and powers various appliances such as water valves and motors. For other appliances, a plurality of relays may be mounted off the control board and electrically connected with components of the board. The relays are selectively energized for controlling the various functions of the appliance. The specific construction of the apparatus required for the mechanical functions of the appliance are well known to those skilled in the art and form no part of the present invention. For that reason, they will not be described in detail, it being understood that the relays open and close the required electrical circuits for proper operation of the appliance.

The optical transceiver 38 preferably provides two-way communication between an appliance, such as a washer 18 (FIG. 2) and the hand held probe 24 (FIG. 3). The appliance can thus transmit information to the probe 24 via its emitter 40 and receive information from the probe 24 via its detector 42. Both the probe and the data unit include memory to store information transmitted during the communication protocol.

If data accumulated by the appliance is to be collected using the probe 24, the user selects the collection mode from a menu displayed on the screen 25 of the probe 24 by the keypad 28 and begins communication with the appliance by pulling the probe's trigger 30. If the user wants to set-up or change the operational parameters of the appliance using the probe 24, the user selects a setup or configuration mode by the keypad 28 and sends a setup record to the appliance by pulling the trigger 30. An initial setup record is preferably created at a remote computer site and loaded into the memory of the probe 24. An initial setup record may be created on-site using the keypad 28 of the probe 24, however, this is generally not as convenient. The present invention allows the setup of one appliance or portions thereof to be copied onto other appliances without loading separate setup records for each appliance. As an alternative to using the probe 24 to setup the appliance, certain parameters may be configured by the group of switches 36 as previously described.

An output 44 of the microprocessor 34 may be used and controlled by appropriate programming in a manner well known to those of ordinary skill in the art to control the optical emitter 40. The output 44 may be controlled by suitable programming of the micro. processor 34 to generate coded outputs corresponding to, for example, data received by the microprocessor 34 from various machine monitoring inputs 46 and stored in the internal memory registers of the microprocessor 34 for subsequent transmission. To avoid interference by ambient infrared and optical signals which are typically present, it is desirable to encode the transmitted intelligence on a known carrier frequency. In the preferred embodiment, communications are provided by synchronous signals at 1200 baud encoded on a 30±1 Kilohertz carrier frequency. This encoding is accomplished by the microprocessor 34 in manners well known by those skilled in the art. Of course other forms of encoding may be employed if desired.

If encoding on a carrier frequency, as preferred, is employed, the receiving circuitry may include a demodulator and buffer amplifier 48. In the preferred embodiment, a Motorola demodulator and preamplifier, Part No. MC3373P, is employed and the discriminated output signal is supplied to an interrupt input 50 of the microprocessor 34. Alternatively, the received signal may be supplied directly to the microprocessor 34 which itself may then decode and further discriminate the intelligence as desired in manners known in the art.

The electro-optical communication between the probe 24 and the data acquisition unit is initiated by aiming the optical communications window 26 (FIG. 3) of the portable probe 24 at the optical communications window 22 (FIG. 2) of the appliance. The probe 24 is activated by pulling the trigger button 30 to send a signal to the optical transceiver 38 of the appliance. The receiving circuitry consisting of the optical detector 42 and demodulator 48 of the appliance delivers a demodulated signal to the interrupt 50 input of the microprocessor 34 as is well known to those skilled in the art. Preferably the communication between the data acquisition unit and the collection probe is two-way with the collection probe sending control and command signals and the data acquisition unit replying by sending data records which were stored in the data unit during the operation of the appliance. The specific signals transmitted and received by the probe and the data acquisition unit will be described hereinafter.

The duplication process can be described generally as follows and a more detailed description will be given with reference to the flow charts of FIGS. 5a–h.

The duplication process involves the copying of parameters from one appliance to another. The duplication option provides a very quick and easy way to propagate a parameter change such as pricing or cycle length throughout an entire operation. Host-originated setups do not have to be preloaded into the memory of the probe and the operator does not have to manually key press the newly desired setup for each appliance in the field.

The probe 24 communicates with a first machine to modify the setup of the first machine, monitor information accumulated by the machine or collect information accumulated by the machine. The user then enters the setup mode or, if already in setup mode, remains in the setup mode. The duplication option is selected from the setup menu displayed on the screen of the probe by pressing the letter "D" on the keypad of the probe. One of two options are displayed and the user may toggle between two screens which alternately display the options "duplicate pricing" and "duplicate cycle setup" by pressing the letter "T" on the keypad of the probe. If the user wants to duplicate the pricing parameters of a first appliance onto a second appliance, the user toggles to the screen "duplicate pricing", aims the communication window of the probe at the second appliance and sends signals to the appliance by pulling the probe's trigger. As will be described in detail hereinafter, this causes the pricing parameters of the first appliance to be copied or duplicated onto the second appliance. Preferably the pricing parameters include coin values and regular and special pricing. If the duplicate setup option is chosen, pricing along with all pertinent cycle information is copied or duplicated from the first appliance onto the second appliance. Preferably, setup duplication is performed on similar appliances since different appliances may have different setup parameters.

Important to the present invention is that the identification of the first and second appliances are not altered by the duplication process, therefore each appliance retains its unique identity.

When the probe 24 is used to interrogate a data acquisition unit, a specific interrogation and verification protocol is preferably performed before the data unit in the appliance will output any data from its registers. This protocol is described in detail in copending patent application, incorporated herein by reference, entitled "Data Acquisition System Having Selective Communicative Capability" by Scott Merkle and Doug Ochsner and assigned to the MAYTAG Corporation, U.S. patent application Ser. No. 07/872,062 filed Apr. 22, 1992. Generally, according to the above-referenced application, if the probe 24 is used to setup an appliance, the probe 24 preferably monitors the appliance and receives from the appliance a collection record indicating the appliance's current setup and counts and immediately sends a setup message to configure the appliance.

The setup message transmitted by the probe 24 may have numerous fields of information. While a particular message format will be described, it is for exemplary purposes only and does not limit the present invention. The message format for the setup message preferably has an 8 byte preamble plus a variable number of data bytes. The preamble is used to identify this message as a setup message and should indicate the total number of data bytes in the message. An example of a particular format for the preamble utilizes the first byte as a message identifier which is used to distinguish this message from other messages. The second byte defines the least significant 8 bits of a 14 bit count defining total number of data bytes in the message. The least significant 6 bits of the third byte define the most significant 6 bits of the 14 bit count defining total number of data bytes in the message. The fourth through sixth bytes are unused.

The seventh and eighth bytes define a cyclic redundancy check known as CRC-16 for the first 6 bytes of this message. The CRC-16 algorithm is defined by the equation $P^{(X)}=X^{16}+X^{15}+X^2+X^0$. [See, W. Stallings, *Data Computer Communications*, pages 105–110 (MacMillian Publishing Co. 1985) incorporated herein by reference.]

Immediately following the preamble are the data bytes. The first through the Nth bytes define an appliance setup record. The Nth+1 and the Nth+2 bytes define CRC-16 for the N data bytes. An example of data bytes that may be employed in a setup record are shown in Table I below. This is merely illustrative and is not intended to limit the present invention to any particular record format.

TABLE I

| Field Name | Field Length (byte) | Field Position |
|---|---|---|
| Record Type | 1 | 1 |
| Model Code | 1 | 2 |
| Machine ID No. | 3 | 3 |
| Position Code | 1 | 6 |
| Location No. | 3 | 7 |
| Regular Price | 1 | 10 |
| Special Price | 1 | 11 |
| Features | 1 | 12 |
| Special Price Days of Week | 1 | 13 |
| Special Price Begin Time | 1 | 14 |
| Special Price End Time | 1 | 15 |
| Reg. Price Dryer Cycle Length | 1 | 16 |
| Special Price Dryer Cycle Length | 1 | 17 |
| Washer Cycle Length | 1 | 18 |
| Number of Rinses per Cycle | 1 | 19 |
| Minutes of Rinse Agitation | 1 | 20 |
| Value of Coin 1 | 1 | 21 |
| Value of Coin 2 | 1 | 22 |
| Action Code | 1 | 23 |

Each field has a length measured in bytes with each byte having eight bits. Not every field will be described since the field name provides sufficient description as to the contents of the field.

The first five fields provide information about the appliance and its location. Specifically, the first field contains information concerning the record type which is a 1 character binary field that identifies this setup record for a particular machine, for example, different brands of washers would have different values in this field. The second field contains information concerning the model code which is a 1 byte binary field designating the model code of the machine. The third field contains information concerning the machine ID number which is 3 byte field that is determined by the user. It should be unique for each machine in a particular commercial operation. The fourth field contains information concerning the position code which is a 1 byte field designating the position of the machine in the store. The fifth field contains information concerning the location number which is a 3 byte field that is to be determined by the user. It can be used to specify a machine, building address, store, branch area or apartment, for example.

The remaining fields provide information about the operating parameters of the appliance. Specifically, the sixth field contains information concerning regular price which is a 1 byte field that represents the price of a regular cycle preferably in nickels. The seventh field contains information concerning special price which is a 1 byte field that represents the price of a special cycle preferably in nickels. The eighth field contains information concerning the fixed cycle and special pricing features which is a 1 byte field that represents features which are selected. Bit 0 of the eighth field selects a fixed cycle option while bit 1 of the eighth field selects a special pricing option. The fixed cycle option does not allow the user to buy partial cycles. The special pricing option allows a different price for the machine at certain times of the week. The ninth field contains information concerning the special price days of week which is a 1 byte field representing the days of the week to have special pricing. For example, bits 0–6 may represent the seven days of the week, with Sunday as bit 0. The tenth field contains information concerning the special price begin time which is a 1 byte field representing the starting time of the special price. The eleventh field contains information concerning the special price end time which is a 1 byte field representing the ending time of the special price. The seventeenth field contains information concerning the value of coin 1 which is a 1 byte field. The eighteenth field contains information concerning the value of coin 2 which is a 1 byte field.

The nineteenth field defines an "action code" which is a 1 byte field. Depending upon the value of the action code byte, the appliance will adopt particular fields of the setup record as will be described in detail hereinafter.

Table II below illustrates the action code values, the associated bits which need to be set and the adopted fields. A set bit indicates that a bit is in either a high or low state, preferably a high state compared to the other bits. Setting bits is well known by those of ordinary skill in the art and thus need not be further described.

TABLE II

| Action Code Value | Set Bit | Adopted Field |
|---|---|---|
| 0 | n/a | no action |
| 1 | 0 | set or clear serial # |
| 2 | 1 | set location/position and machine id |
| 4 | 2 | set price/coin values |
| 16 | 4 | set cycle length/# of rinses |
| 32 | 5 | clear interval counts |
| 128 | 7 | record already used |

For example, if bit 2 of the action code byte is set, the action code will have a value of four. As shown in Table II, when the action code has a value of four, the values specified in the setup record for regular pricing, special pricing and coin values are selected. If bit 4 of the action code byte is set, the action code will have a value of sixteen. As shown in Table II, when the action code has a value of sixteen the values specified in the record for the remaining setup fields such as cycle lengths, fixed cycles and number of cycles to mention only a few are selected.

As discussed above, if the parameters of a first appliance are to be copied onto a second appliance, the probe first communicates with the first appliance and copies the setup portion of the received record of the first appliance into registers of the probe's memory. This includes the setup parameters discussed above.

FIGS. 5a–d are flow charts illustrating the duplication communication protocol. The blocks of the flow charts illustrated in FIGS. 5a–d are representative of both the structure of the present invention and the function of that structure. Although in the preferred embodiments most of the decisional and operational units shown in these flow charts are contained internally in the microprocessor chip, it is equally feasible to construct them of conventional logic integrated circuits, or even with discrete components. Thus, the representation of the boxes in the flow charts of the present invention are both structural and functional and can be interpreted as hardware and/or software. In these figures, rectangles are provided to illustrate operational devices or units which may be flip-flops, solenoids, relays, etc.; and where diamonds are provided to represent decision units which may be comparators, coincidence gates, or the like. Since the physical construction of each operation unit, adn each decision unit, is obvious to those skilled in the art from a considertion of its function, the specific construction which may be employed for the various operation units and decision units will not be described in detail. The decision units and operation units shown in the flow charts of the present invention operate in a prescribed sequence, and control the manner in which the various functions are carried out. For that reason, the flow charts will be described in terms of one unit passing control to the next unit, implying that the previous operation or decision has been completed.

The user selects the setup option by pressing the letter "S" on the keypad of the probe. A setup menu is displayed having various options including duplication. The user selects the duplication option by pressing the letter "D". As discussed earlier, the memory of the probe has stored in registers the setup information of a first appliance which was the last appliance the probe communicated with before the duplication option was selected. This setup information stored in the probe's memory will be copied onto the next appliance. The user aims the probe at the optical window of a second appliance. Unit 50 (FIG. 5a) determines if this is the first time the duplication mode has been selected since the last login. If it is, then control is passed to unit 52 and a flag is set to duplicate pricing. Control is passed to unit 54 where it is determined if the flag is set to duplicate pricing. If the flag is set to duplicate pricing, control is passed to unit 56 which resets the flag to duplicate pricing. Control is then passed to unit 58 where displayed on the screen of the probe is "Duplicate Pricing (T)oggle". If the flag is not set to duplicate pricing as determined by unit 54, control is passed to unit 60 which resets the flag to duplicate cycle setup. Control is then passed to unit 62 which displays on the screen of the probe "Duplicate Cycle Setup (T)oggle". Control is then passed from either unit 58 or 62 to unit 64 which waits for a command from the user.

When a command is detected, control is passed to unit 66 which determines the nature of the input. The user has the option of exiting the duplication mode and selecting between the duplicate pricing and duplicate cycle setup options. Unit 66 determines if the letter "R" was pressed. The "R" key stands for return and allows the user to exit the duplication mode and return to the main setup screen. If the letter "R" was not pressed, control is passed to unit 68 which determines whether the letter "T" was pressed. As described earlier, the Duplicate Pricing and Setup screens also display the option "(T)oggle". By repeatedly pressing the letter "T", the user can toggle back and forth from one screen to the other. If the letter "T" was pressed, control is passed to unit 70 which determines if the flag is set to duplicate cycle setup. If it is, control is returned to unit 56 (FIG. 5a) which receives this input and displays "Duplicate Pricing (T)oggle" on the screen of the probe. If the flag is not set to duplicate setup, control is returned to unit 62 (FIG. 5a) which sets the flag to duplicate cycle setup.

If the letter "T" was not pressed, control is passed to unit 72 which determines whether the probe's trigger has been pulled. If the trigger has not been pulled, control is passed to unit 74 which calls a subroutine and indicates that an invalid selection has been made. Control is then passed to unit 76 which determines whether the flag is set to duplicate pricing. If it is, control is returned to unit 56 (FIG. 5a) where the duplicate pricing option is displayed on the screen otherwise, control is returned to unit 60 (FIG. 5a) where the duplicate cycle setup option is displayed.

If unit 72 indicates that the trigger has been pulled, duplication is initiated. Control is passed to unit 78 which begins the duplication communication by receiving information from the second appliance. Unit 78 receives data from the second appliance in the form of a collection record as described earlier. Control is then passed to unit 80 which determines if the receiving information communication was successful. If it was not, control is returned to the main setup screen where the user may again select the duplication option. If the communication was successful, control is passed to unit 82 where the data stored in the probe's memory in a buffer is shifted to a change buffer. As described earlier, the buffer contains the setup information of the first appliance. That information is shifted into the change buffer and the buffer is overwritten with setup information received from the second appliance is now stored into the buffer. Control is then passed to unit 84 which determines if the flag is set to duplicate cycle setup. If it is, control is passed to unit 86 where it is determined if the model code of the second machine stored in the buffer is the same as the model code of the first machine stored in the change buffer.

If the flag is not set to duplicate setup, control is passed to unit 88 which determines what type of appliance the probe is currently communicating with by looking at the record type field in the collection record previously sent by the second appliance. Appliances may be classified by manufacturer or brand, for example. If the second appliance is a particular type, control is passed to unit 90 which determines if the first machine is the same type. If the second machine is not a certain type, control is passed to unit 92 which determines if the first machine is a certain type.

If the models of machines are not identical as determined by unit 86 or the first and second machines are not the same type as determined by units 88 and 90 or that the first machine is a certain type as determined by unit 92, control is passed to unit 94 (FIG. 5d) which calls a subroutine to indicates that the parameters of the first appliance may not be duplicated onto the second appliance. A sad tone alerts the user that duplication has not taken place. Control is the passed to unit 96 which stores the error message in the probe's memory for record keeping purposes. Control is then returned to setup menu.

Figure 5A:
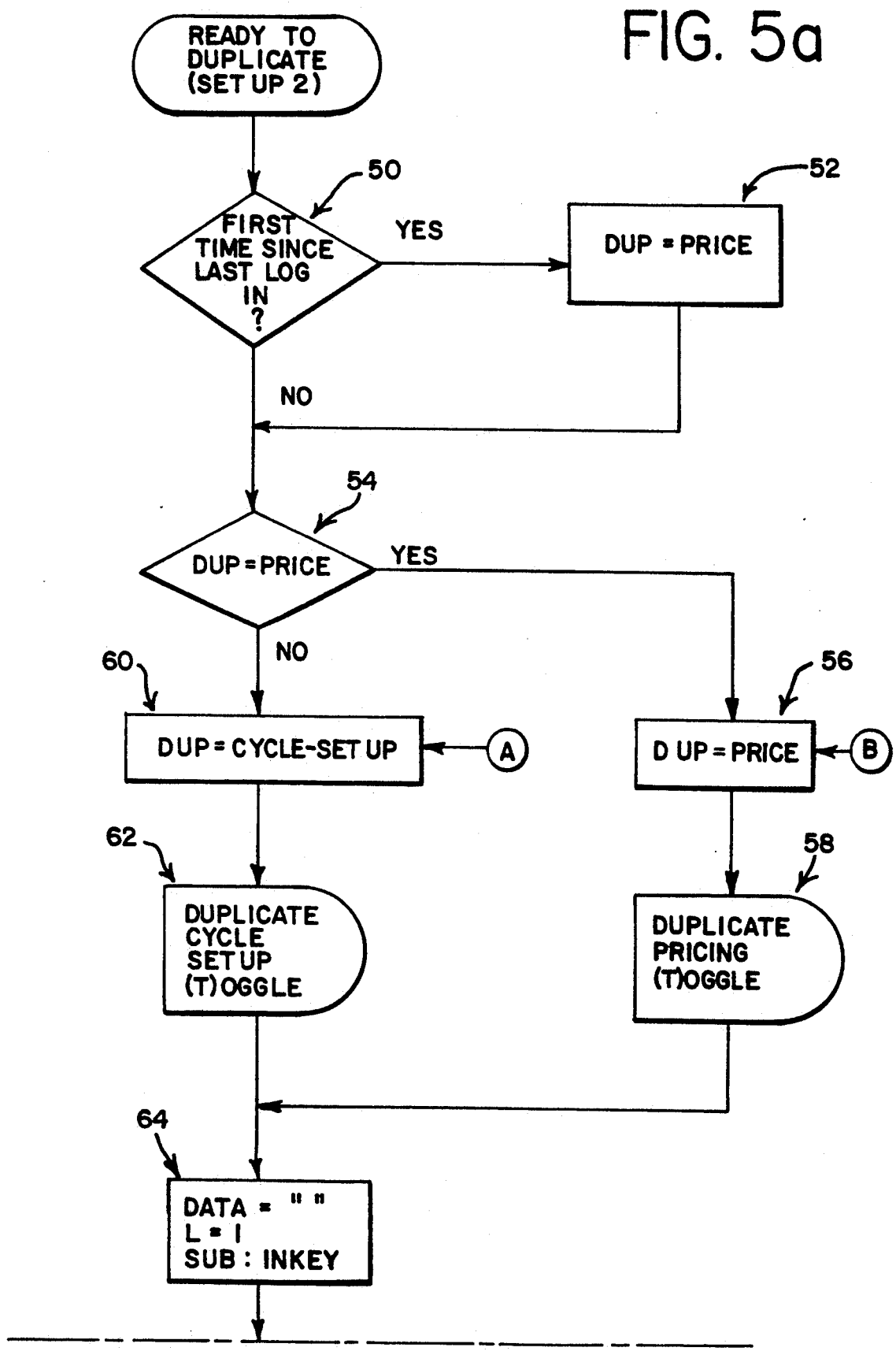
FIGS. 5a, 5b, 5c, and 5d are flow charts illustrating the duplication communication protocol.
Figure 5B:
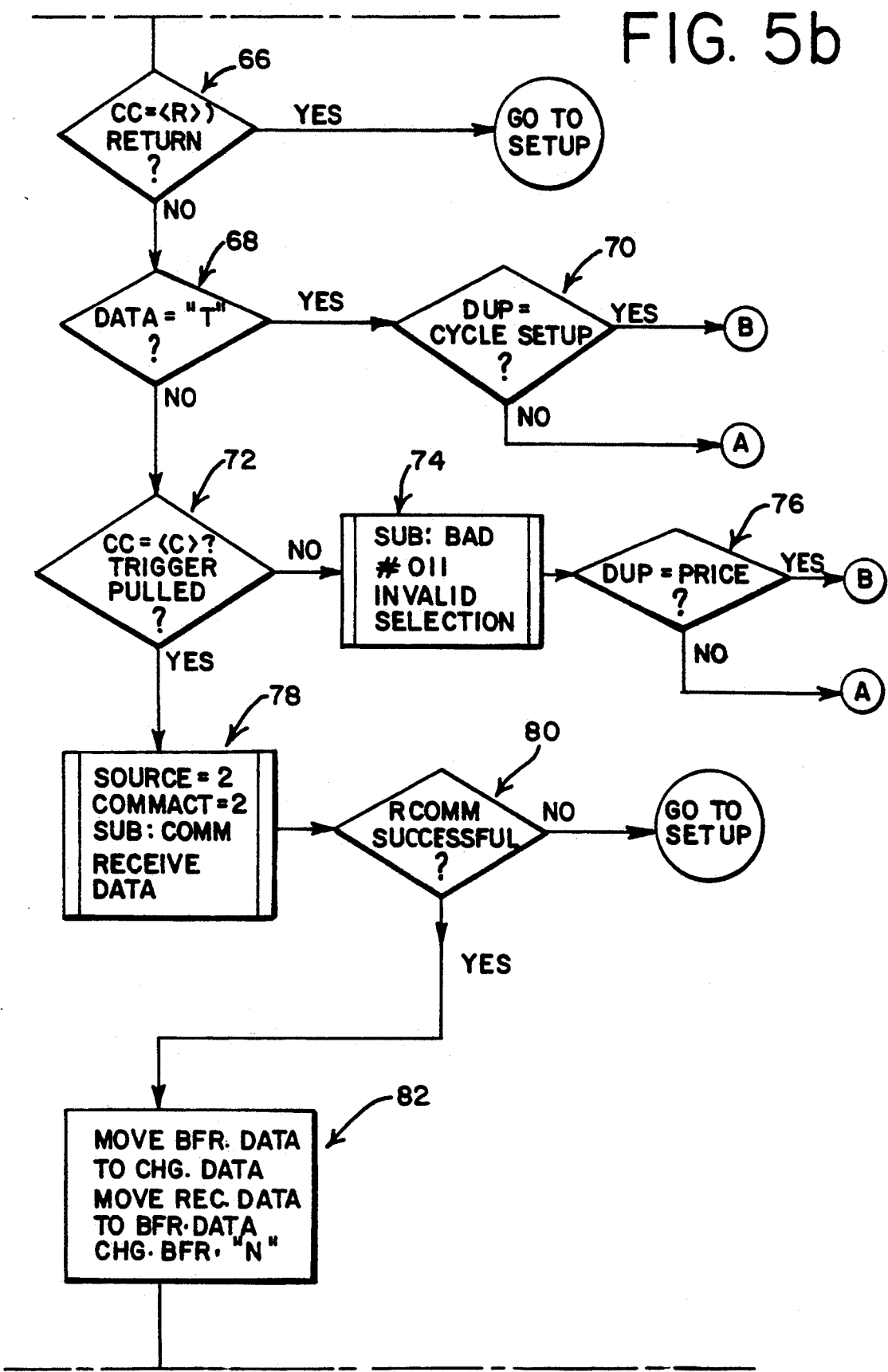
Figure 5C:
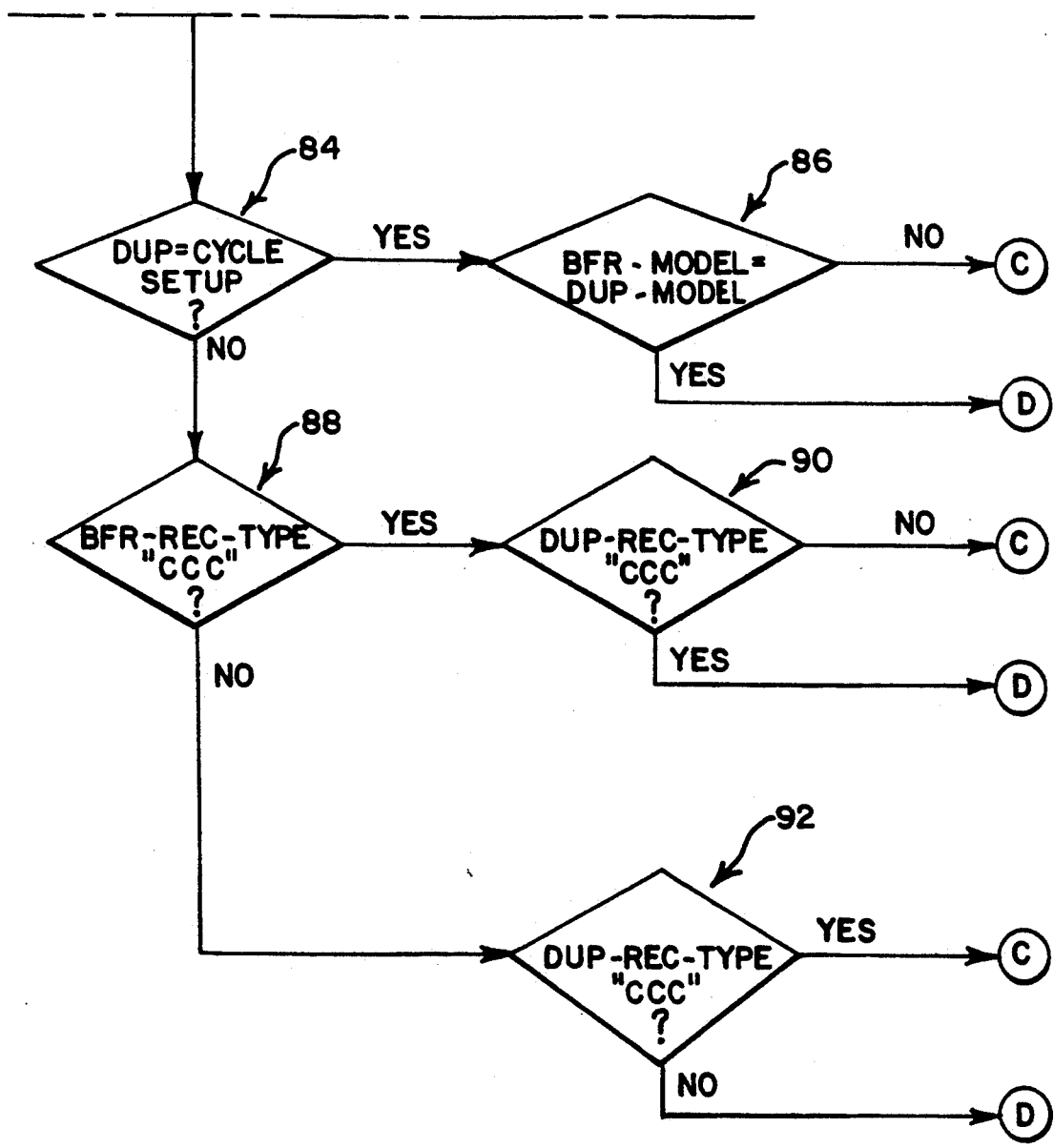
Figure 5D:
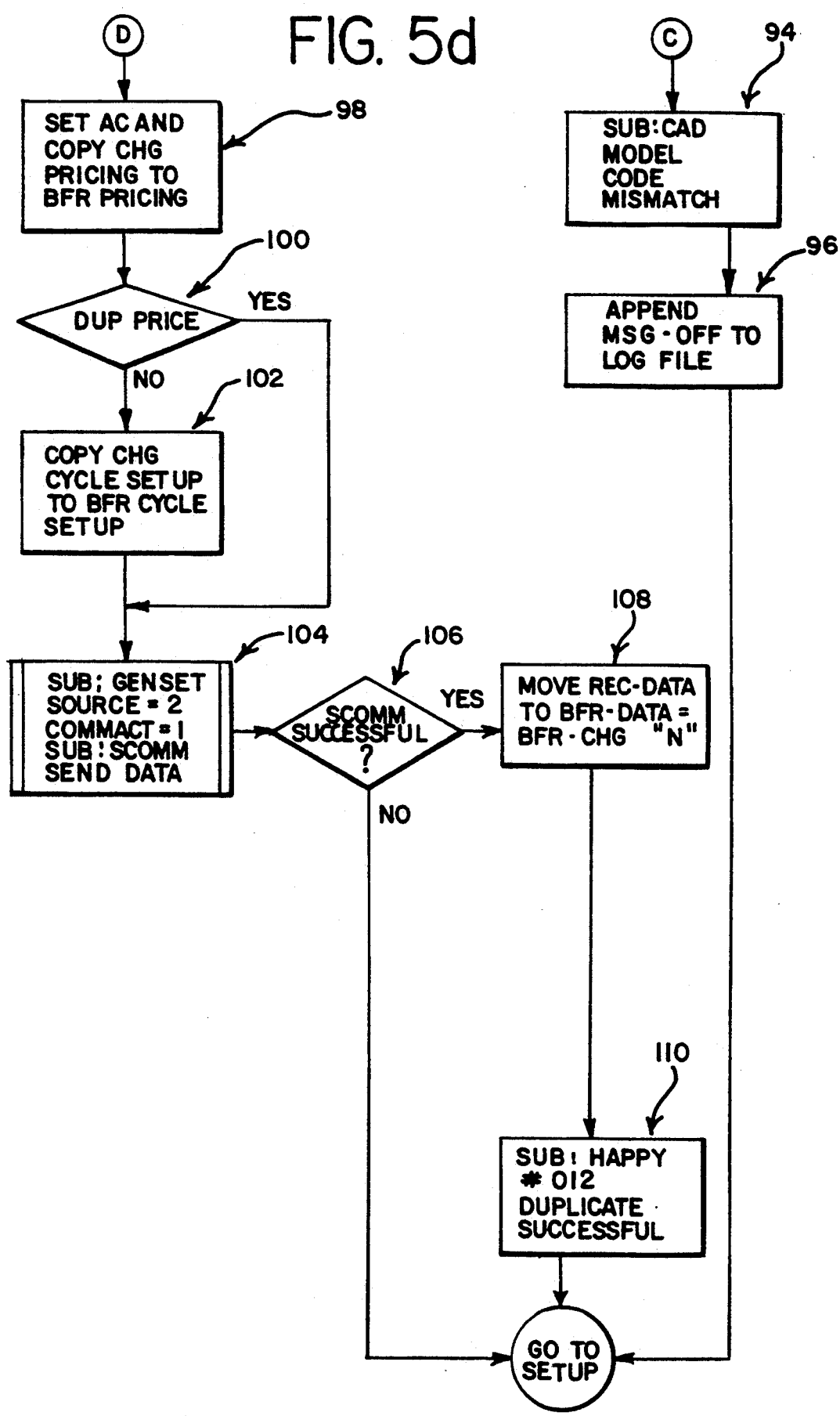

If the model of the first and second machines match as determined by unit 86 or the first and second machines are of the same type as determined by units 88 and 90 or the first machine is not a certain type as determined by unit 92, control is passed to unit 98 (FIG. 5d). A setup record for the second appliance is now created. Unit 98 sets bits 2 and 4 of the action code and copies the pricing parameters stored in the change buffer to the pricing parameters stored in the buffer. Thus the buffer, which originally had the second machine's pricing parameters, now has the pricing parameters of the first machine. Control is then passed to unit 100 which determines if the flag is set to duplicate pricing. If it isn't, then the duplicate cycle setup option was selected and control is passed to unit 102 which copies the cycle parameters of the first machine stored in change buffer to the cycle parameters of the second machine stored in the buffer. Control is then passed to unit 104 where the newly developed setup record stored in buffer is transmitted to the second appliance. Control is then passed to unit 106 which determines if the setup communication was successful. If it was not successful, control is returned to the setup menu. If the setup communication was successful, control is passed to unit 108. After the second appliance receives the new setup record from the probe, it responds by sending it newly created setup record back to the probe. Unit 108 takes the setup record transmitted by the second appliance and stores it in the buffer memory of the probe. Control is passed to unit 110 which indicates the duplication was successful. Control is then returned to the setup menu. The next time the duplication option is selected, the buffer of the probe contains the setup information from the last appliance communicated with, i.e., the second appliance.

The source code for the duplication communication protocol is set out at the end of the detailed description before the claims.

While the present invention has been described with reference to an appliance and in particular a washer and dryer, those skilled in the art will appreciate that the present invention can be used in conjunction with many other devices which require configuration of the control board to control the operation of the device.

While the invention has been shown and described in connection with particular preferred embodiments, it is apparent that certain changes and modifications, in addition to those mentioned above, may be made by those who are skilled in the art without departing from the basic features of the present invention. Accordingly, it is the intention of the Applicants to protect all variations and modifications within the true spirit and valid scope of the invention.

©MAYTAG CORPORATION, 1992

```
@SSETUP2:
@S'        if first_entry then dup=pricing
@S'        duplicate cycle setup (T)oggle
@S'        IF !FIRSTENT!=1 THEN !DUP!=0
@S         IF !DUP!<>1 THEN GOTO SETUP2B
@S'Setup_2a
@SSETUP2A:
@S'        set first_entry false
@S         !FIRSTENT!=0
@S         !DUP!=1
@S         PRINT #0, USING "P1,C32",
"PULL=duplicate setup (T)oggle"
@S'Setup_2a1
@SSETUP2A1:
@S'        data="":!LENGTH!=1:Gosub inkey
@S         !DAT$!="":!LENGTH!=1: !DISP!=1 :
!ENTER!=1 : !DEL!=0 : !TRIGGE
@S         GOSUB *INKEY
@S         IF !CC$!=")" THEN GOTO *LOGIN
@S'        if cc=(R) or return the good_beep : goto
setup
@S         IF !CC$!=CHR$(13) THEN GOTO SETUP
@S         IF !CC$!="R" THEN GOTO SETUP
@S'        if data="T" begin
@S'           if dup=cycle.setup then goto setup_2b
@S'           else goto setup_2a
@S'        end
@S         IF !DAT$!="T" THEN IF !DUP!=1 THEN GOTO
SETUP2B ELSE GOTO SETU
@S'        if cc <> <C> or trigger not pulled begin
@S'           gosub bad #11
@S'           if dup=price then goto setup_2b
@S'           else goto setup_2a
@S'        end
@S         IF !CC$!<>CHR$(3) THEN !ERROR!=11:PRINT
#0,USING "P1,C32","E0
```

```
UP!=0 THEN GOTO SETUP2B ELSE GOTO SETUP2A
    @S'         type="S" : gosub rcomm
    @S'         !SOURCE$!="2"
    @S          !COMMACT!=2 : GOSUB *COMM
    @S'         if rcomm unsucessful or err <> 0 then
    goto setup
    @S          IF !ERROR!<>0 THEN GOTO SETUP
    @S'         move bfr.data to chg.data: move rec.data
    to bfr.data:bfr.chg=
    @S          !CHG.MACHID!=!BFR.MACHID!
    @S          !CHG.POSITION!=!BFR.POSITION!
    @S          !CHG.LOCATION!=!BFR.LOCATION!
    @S          !CHG.DEBOUNCE!=!BFR.DEBOUNCE!
    @S          !CHG.RECTYPE!=!BFR.RECTYPE!
    @S          !CHG.REGPRC!=!BFR.REGPRC!
    @S          !CHG.SPCPRC!=!BFR.SPCPRC!
    @S          !CHG.FEAT!=!BFR.FEAT!
    @S          !CHG.SPCDAY!=!BFR.SPCDAY!
    @S          !CHG.BEGTIME!=!BFR.BEGTIME!
    @S          !CHG.ENDTIME!=!BFR.ENDTIME!
    @S          !CHG.REGDRYER!=!BFR.REGDRYER!
    @S          !CHG.SPCDRYER!=!BFR.SPCDRYER!
    @S          !CHG.WASHTIME!=!BFR.WASHTIME!
    @S          !CHG.RINSETIME!=!BFR.RINSETIME!
    @S          !CHG.NUMRINSES!=!BFR.NUMRINSES!
    @S          !CHG.COIN_1!=!BFR.COIN_1!
    @S          !CHG.COIN_2!=!BFR.COIN_2!
    @S          !CHG.DROP1!=!BFR.DROP1!
    @S          !CHG.DROP2!=!BFR.DROP2!
    @S          !CHG.ACTCODE!=!BFR.ACTCODE!
    @S          !BFR.CHG$!="N"
    @S          RECRD$=!01$!
    @S          !SHORTEXT!=1
    @S          GOSUB *EXTRCT
    @S          GOSUB MOVEDATA
    @S'         if dup=cycle.setup begin
    @S'             if bfr.model=dup.model then goto
                setup_2d
    @S'             goto setup_2c
    @S'         end
    @S          IF !DUP!=1 THEN IF
                !BFR.RECTYPE!=!CHG.RECTYPE! THEN GOTO
                SETUP
    @S'         if bfr.rec.type = "CCC" begin
    @S'             if dup.rec.type<>"CCC" then goto
                setup_2c
    @S'             goto setup_2D
    @S'         end
    @S          IF !BFR.RECTYPE!=0 THEN IF
                !CHG.RECTYPE!<>0 THEN GOTO SETUP2C
    @S'         if dup.rec.type="CCC" then goto setup_2c
    @S          IF !CHG.RECTYPE!=0 THEN GOTO SETUP2C
    @S'         goto setup_2D
    @S          GOTO SETUP2D
    @S'
    @S' setup_2b
```

```
@S'         dup=price
@S'         Duplicate pricing (T)oggle
@S'         goto setup_2a1
@SSETUP2B:
@S'         set first_entry false
@S          !FIRSTENTI=0
@S          !DUP!=0
@S          PRINT #0, USING "P1,C32","PULL=duplicate
pricing (T)oggle"
@S          GOTO SETUP2A1
@S'
@S'setup_2d
@SSETUP2D:
@S'         set ac for pricing and cycle lengths and
            copy field for both
@S'         set ac for cycle setup changes move
            chg.cycle setup data to bfr
@S          !BFR.ACTCODE!=20
@S          !BFR.REGPRC!=!CHG.REGPRC!
@S          !BFR.SPCPRC!=!CHG.SPCPRC!
@S          !BFR.FEAT!=!CHG.FEAT!
@S          !BFR.SPCDAY!=!CHG.SPCDAY!
@S          !BFR.BEGTIME!=!CHG.BEGTIME!
@S          !BFR.ENDTIME!=!CHG.ENDTIME!
@S          !BFR.COIN_1!=!CHG.COIN_1!
@S          !BFR.COIN_2!=!CHG.COIN_2!
@S          !BFR.DROP1!=!CHG.DROP1!
@S          !BFR.DROP2!=!CHG.DROP2!
@S          IF !DUP!=0 THEN GOTO SETUP2D1
@S          !BFR.REGDRYER!=!CHG.REGDRYER!
@S          !BFR.SPCDRYER!=!CHG.SPCDRYER!
@S          !BFR.WASHTIME!=!CHG.WASHTIME!
@S          !BFR.RINSETIME!=!CHG.RINSETIME!
@S          !BFR.NUMRINSES!=!CHG.NUMRINSES!
@S'setup_2d1
@SSETUP2D1:
@S'         GENERATE SETUP STRINGS
@S          GOSUB *GENSET
@S'         setup comm variables
@S'           !SOURCE$!="2"
@S          !COMMACT!=1
@S'         gosub scomm
@S          GOSUB *SCOMM
@S'         if scomm unsucessful or err <> 0 goto
            setup_2d2
@S          IF !ERROR!<>0 THEN GOTO SETUP2D2
@S'         move rec.data to bfr.data : bfr.chg="N"
@S          GOSUB MOVEFILE : !BFR.CHG$!="N"
@S'         move pricing into previous fields;
            update recrd$ for viewing pu
@S          IF !D1$!(1:1)=CHR$(25) THEN GOSUB
            MOVEPRE :!RECRD$!(2:24)=!D1$
@S          IF !D1$!(1:1)<>CHR$(25) THEN
            !RECRD$!(2:9)=!D1$!(2:9) : !RECRD$
@S          gosub happy #12
@S          PRINT #0,USING "P1,C32","    DUPLICATE
   SUCCESSFUL"
```

```
@S       GOSUB *HAPPBEEP
@S'      goto setup
@S       GOTO SETUP
@S'
@S'setup_2c
@SSETUP2C:
@S'      gosub sad
@S'      err=11.1
@S       GOSUB *SADBEEP
@S       !D1$!="E11.1 MODEL CODE MISMATCH"
@S       PRINT #0, USING "P1,C32",!D1$!
@S'      append msg.err to log file
@S       GOSUB *WRITETO
@S'setup_2d2
@SSETUP2D2:
@S'      goto setup
@S       GOTO SETUP
@S'
```

What is claimed is:

1. A method of effecting a setup record change throughout a plurality of appliances, each appliance having a memory storing an original setup record, the setup record including a plurality of setup parameters, comprising the steps of:
   providing an interrogator having a memory including a first and a second buffer register, the first buffer register storing the new setup parameters;
   interrogating a first of the plurality of appliances with the interrogator wherein the appliance transmits to the interrogator its original setup record stored in the appliance's memory;
   storing the original setup record transmitted by the appliance in the second buffer register of the interrogator's memory;
   replacing the original setup parameters of the original setup record stored in the second buffer register with the new setup parameters stored in the first buffer register to create a new setup record in the second buffer register;
   transmitting the new setup record stored in the second buffer register to the appliance wherein the original setup record stored in the memory of the appliance is replaced by the new setup record; and
   repeating the above steps with respect to each of the plurality of appliances.

2. A method according to claim 1 further comprising the step of replacing the contents of the first buffer register with the contents of the second buffer register.

3. A method according to claim 1 wherein the interrogator comprises a hand-held probe.

4. A method according to claim 1 wherein the interrogator communicates electro-optically with the plurality of appliances.

5. An apparatus for effecting a setup parameter change throughout a plurality of appliances comprising:
   a first memory storing a new setup parameter;
   a first transceiver;
   a first controller communicating with the first memory and the first transceiver;
   a second memory storing the appliance's original setup record, the setup record having a plurality of setup parameters;
   a second transceiver;
   a second controller communicating with the second memory and the second transceiver,
   wherein the first controller directs the first transceiver to transmit an interrogation signal to the second transceiver, the second controller in response to the interrogation signal received by the second transceiver directs the second transceiver to transmit the original setup record stored in the second memory to the first transceiver wherein the first controller in response to the transmitted setup record directs the first memory to store the original setup record in the first memory,
   the first controller capable of running a routine to replace a setup parameter of the original setup record with the new setup parameter stored in the first memory to create a new setup record and directs the first transceiver to transmit the new setup record to the second transceiver wherein the second controller directs the second memory to replace the original setup record stored in the second memory with the received new setup record.

6. An apparatus according to claim 5 wherein the first memory includes a first buffer register to store the new setup parameter and a second buffer register for storing the original setup record.

7. An apparatus according to claim 5 wherein the second memory, the second transceiver and the second controller are located in the appliance.

8. An apparatus according to claim 5 wherein the first memory, first transceiver and first controller are separate from the appliance.

9. An apparatus according to claim 8 wherein the first memory, first transceiver and first controller are located in a hand-held probe.

10. An apparatus according to claim 5 wherein the first and second transceivers communicate electro-optically.

11. An apparatus according to claim 10 wherein the first and second transceivers communicate with infrared signals.

12. An apparatus for effecting a parameter change throughout a plurality of appliances, each appliance having a first memory for storing an original setup record, a first transceiver and a first controller communicating with the first memory and the first transceiver, comprising:
- a second memory for storing the at least one new setup parameter;
- a second transceiver;
- a second controller communicating with the second memory and the second transceiver, the second controller directing the second transceiver to transmit an interrogation signal to the appliance, the first controller of the appliance directing the first transceiver to transmit the setup record stored in the first memory in response to the interrogation signal,
- the second controller directing the second memory to store the setup record transmitted by the first transceiver wherein the second controller is capable of running a routine to replace at least one of the setup parameters of the original setup record with the new setup parameter stored in the second memory to create a new setup record and directs the second transceiver to transmit the new setup record to the first transceiver wherein the first controller directs the first memory to replace the stored original setup record with the new setup record received by the first transceiver.

13. An apparatus according to claim 12 wherein the second memory includes a first buffer register for storing the at least one new setup parameter and a second buffer register for storing the original setup record transmitted by the first transceiver.

14. An apparatus according to claim 12 wherein the first and second transceivers communicate electro-optically.

15. An apparatus according to claim 12 wherein the second memory, the second transceiver and the second controller are located in a hand-held probe.

* * * * *

UNITED STATES PATENT AND TRADEMARK OFFICE
CERTIFICATE OF CORRECTION

PATENT NO. : 5,295,063
DATED : March 15, 1994
INVENTOR(S) : Brent A. England

It is certified that error appears in the above-identified patent and that said Letters Patent is hereby corrected as shown below:

ON THE TITLE PAGE

In the Abstract, lines 12-13, delete "parameter of the setup record buffer, then" and substitute therefor --record is stored in the second buffer. Then--.

Column 5, lines 17-18, delete "micro. processor" and substitute --microprocessor--.

Column 9, line 11, delete "adn" and substitute --and--.

Column 10, line 53, delete "indicates" and substitute --indicate--.

Column 10, line 56, delete "the" and substitute --then--.

Column 11, line 17, delete "sending it" and substitute --sending its--.

Signed and Sealed this

Eighteenth Day of October, 1994

Attest:

BRUCE LEHMAN

Attesting Officer

Commissioner of Patents and Trademarks